US006988058B1

(12) United States Patent
Sherwin et al.

(10) Patent No.: US 6,988,058 B1
(45) Date of Patent: Jan. 17, 2006

(54) QUANTUM COMPUTATION WITH QUANTUM DOTS AND TERAHERTZ CAVITY QUANTUM ELECTRODYNAMICS

(75) Inventors: Mark Stephen Sherwin, Goleta, CA (US); Atac Imamoglu, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/857,822

(22) PCT Filed: Dec. 15, 1999

(86) PCT No.: PCT/US99/29684

§ 371 (c)(1), (2), (4) Date: Sep. 24, 2001

(87) PCT Pub. No.: WO00/36561

PCT Pub. Date: Jun. 22, 2000

Related U.S. Application Data

(60) Provisional application No. 60/123,220, filed on Mar. 8, 1999, provisional application No. 60/112,439, filed on Dec. 16, 1998.

(51) Int. Cl.
*G06F 3/00* (2006.01)
*H01L 29/06* (2006.01)

(52) U.S. Cl. .......................... 703/1; 703/2; 250/214 R; 250/207; 257/14

(58) Field of Classification Search .................... 703/2, 703/13, 1; 257/421, 432, 14, E29.071; 385/122; 359/326; 250/214 R, 207
See application file for complete search history.

(56) References Cited

U.S. PATENT DOCUMENTS

| | | | | |
|---|---|---|---|---|
| 4,749,952 | A | 6/1988 | Morimoto | |
| 4,952,792 | A | 8/1990 | Caridi | |
| 5,530,263 | A * | 6/1996 | DiVincenzo | 257/14 |
| 5,614,435 | A | 3/1997 | Petroff et al. | |
| 5,734,174 | A | 3/1998 | Horiguchi | |
| 5,793,091 | A * | 8/1998 | Devoe | 257/432 |
| 5,917,322 | A * | 6/1999 | Gershenfeld et al. | 324/307 |
| 6,074,892 | A | 6/2000 | Bowers et al. | |
| 6,239,449 | B1 | 5/2001 | Fafard et al. | |
| 6,437,413 | B1 * | 8/2002 | Yamaguchi et al. | 257/421 |
| 6,472,681 | B1 * | 10/2002 | Kane | 257/14 |
| 6,678,450 | B1 * | 1/2004 | Franson | 385/122 |

OTHER PUBLICATIONS

Kash, K. et al., "Observation of Quantum Dot Levels Produced by Strain Modulation of GaAs-AlGaAs Quantum Wells", *Journal of Vacuum Science and Technology*, V. 10, No. 4, Jul. 1992, pp. 2030-2033.

(Continued)

*Primary Examiner*—Thai Phan
(74) *Attorney, Agent, or Firm*—Gates & Cooper LLP

(57) ABSTRACT

A quantum computer is proposed in which information is stored in the two lowest electronic states of doped quantum dots. Multiple quantum dots are located in a microcavity, and a pair of gates controls the energy levels in each quantum dot. A controlled NOT (CNOT) operations involving any pair of quantum dots can be effected by a sequence of gate voltage pulses which tune the quantum dot energy levels into resonance with frequencies of the cavity or a laser. The duration of a CNOT operation is estimated to be much shorter than the time for an electron to decohere by emitting an acoustic phonon.

64 Claims, 6 Drawing Sheets

OTHER PUBLICATIONS

Sopanen, M. et al., "Strain-induced Quantum Dots by Self-organized Stressors", *Applied Physics Letters*, vol. 66, No. 18, May 1, 1995, pp. 2364-2366.

Lee, H. et al., "Strain-engineered Self-assembled Quantum Dot Lattices", *Applied Physics Letters*, V. 78, No. 1 Jan. 1, 2001, pp. 105-107.

* cited by examiner

QUANTUM COMPUTATION WITH QUANTUM DOTS AND TERAHERTZ CAVITY QUANTUM ELECTRODYNAMICS

CROSS REFERENCE TO RELATED APPLICATIONS

This application is related to Provisional Patent Application Ser. No. 60/112,439, filed Dec. 16, 1998, entitled "QUANTUM COMPUTATION WITH QUANTUM DOTS AND TERAHERTZ CAVITY QUANTUM ELECTRODYNAMICS," by Mark S. Sherwin et al., and also related to Provisional Patent Application Ser. No. 60/123,220, filed Mar. 8, 1999, entitled "QUANTUM COMPUTATION WITH QUANTUM DOTS AND TERAHERTZ CAVITY QUANTUM ELECTRODYNAMICS," by Mark S. Sherwin et al, which applications are incorporated by reference herein. This application also claims priority under 35 U.S.C. § 119(e) to both Provisional Patent Application Ser. No. 60/112,439, filed Dec. 16, 1998, entitled "QUANTUM COMPUTATION WITH QUANTUM DOTS AND TERAHERTZ CAVITY QUANTUM ELECTRODYNAMICS," by Mark S. Sherwin et al. and Provisional Patent Application Ser. No. 60/123,220, filed Mar. 8, 1999, entitled "QUANTUM COMPUTATION WITH QUANTUM DOTS AND TERAHERTZ CAVITY QUANTUM ELECTRODYNAMICS," by Mark S. Sherwin et al.

STATEMENT REGARDING FEDERALLY SPONSORED RESEARCH AND DEVELOPMENT

This invention was made with Government support under Grant No. ARO DAAG55-98-1-0366, awarded by the Army. The Government has certain rights in this invention.

BACKGROUND OF THE INVENTION

1. Field of the Invention

This invention relates in general to quantum computation, and in particular to quantum computation with quantum dots and terahertz cavity quantum electrodynamics.

2. Description of Related Art

A quantum computer processes quantum information which is stored in "quantum bits," also called qubits. If a small set of fundamental operations, or universal quantum logic gates, can be performed on the qubits, then a quantum computer can be programmed to solve an arbitrary problem. Quantum computation has been shown to efficiently factorize large integers, and the quantum information can be stored indefinitely, which provides the interest in quantum computation and machines that can perform quantum computation.

Consider, for example, the publication by Barenco, et al., entitled "Conditional Quantum Dynamics In Logic Gates," Physical Review Letters, 15 May 1995, USA, vol. 74, no. 20, pages 4083–4086. This publication notes that quantum logic gates provide fundamental examples of conditional quantum dynamics, and could form the building blocks of general quantum information processing systems, which have recently been shown to have many interesting nonclassical properties. This publication describes a simple quantum logic gate, the quantum controlled-NOT (CNOT), and analyzes some of its applications. The publication also discusses two possible physical realizations of the gates, one based on Ramsey atomic interferometry, and the other on the selective driving of optical resonances of two subsystems undergoing a dipole—dipole interaction.

However, the implementation of a large-scale quantum computer has remained a technological challenge. The qubits must be well isolated from the influence of the environment, but must remain manipulatable in individual units to initialize the computer, perform quantum logic operations, and measure the result of the computation.

Implementations of such a quantum computer have been proposed using atomic beams, trapped atoms and/or ions, bulk nuclear magnetic resonance, nanostructured semiconductors, and Josephson junctions. However, each scheme proposed has limitations that make large-scale implementation difficult and very limiting in performance.

For example, proposals using trapped atoms or ions, qubits couple with collective excitations or cavity photons. This coupling enables two-bit gates involving an arbitrary pair of qubits which makes programming straightforward. However, these schemes require serial gating schemes, whereas error correction schemes require parallelism, thereby limiting the usefulness of data gathered using an atomic or ion trapping machine.

In the semiconductor and superconductor schemes, only nearest-neighbor qubits can be coupled, and significant overhead is required to couple distant qubits. However, these machines can perform some gate operations in parallel, which allows for some error correction.

It can be seen, then, that there is a need in the art for a quantum computer. It can also be seen, then, that there is a need in the art for a quantum computer that can perform parallel gate operations. It can also be seen, then, that there is a need in the art for a quantum computer that can perform parallel gate operations without significant qubit overhead.

SUMMARY OF THE INVENTION

To overcome the limitations in the prior art described above, and to overcome other limitations that will become apparent upon reading and understanding the present specification, the present invention discloses an apparatus and method for quantum computing. The apparatus comprises a control bit structure, a target bit structure, and gate electrodes, coupled to the control bit structure and the target bit structure, for applying a voltage across the control bit structure and the target bit structure, wherein the control bit structure and the target bit structure obtain quantum levels of excitation from the applied voltages based on an initial excitation level of the control bit structure and an initial excitation level of the target bit structure.

The method of the present invention comprises applying a first voltage across a control bit structure, applying a second voltage across a target bit structure, and obtaining quantum levels of excitation within the control bit structure and the target bit structure based on the applied first and second voltages, an initial excitation level of the control bit structure and an initial excitation level of the target bit structure.

An object of the present invention is to provide a quantum computer. Another object of the present invention is to provide a quantum computer that can perform parallel gate operations. A further object of the present invention is to provide a quantum computer that can perform parallel gate operations without significant qubit overhead.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there are illustrated and described specific examples of a method and apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A quantum computer of the present invention stores information in the two lowest quantum electronic states of doped quantum dots. Multiple quantum dots are located in a microcavity, and a pair of gates controls the energy levels in each quantum dot. A controlled NOT (CNOT) operations involving any pair of quantum dots can be effected by a sequence of gate voltage pulses which tune the quantum dot energy levels into resonance with frequencies of the cavity or a laser. The duration of a CNOT operation is estimated to be much shorter than the time for an electron to decohere by emitting an acoustic phonon.

Quantum Bits and Fundamental Quantum Logic Operations

Figure 1:
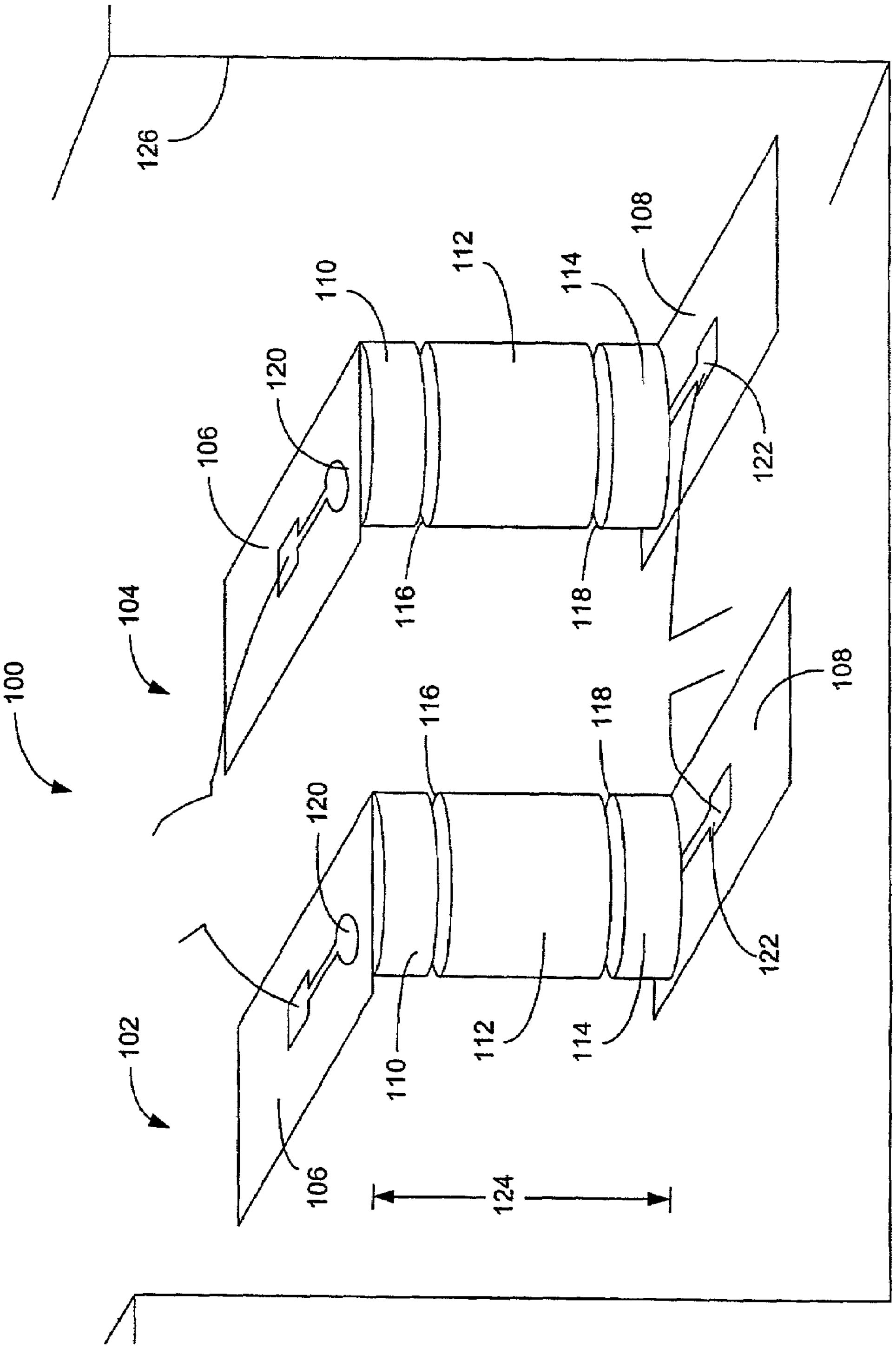
FIG. 1 illustrates the computer of the present invention.

FIG. 1 illustrates the computer of the present invention. The computer comprises two or more structures 100 embedded in a microcavity 126. Each structure 100 is comprised of a control nanostructure 102 and a target nanostructure 104. The control nanostructure 102 controls the control bit 102 of the computer, and the target nanostructure 104 controls the target bit 104 of the computer. Although described separately, control nanostructure 102 and target nanostructure 104 are substantially similar and interchangable within the computer.

Each nanostructure 102 and 104 comprises outer semiconductor layers 106 and 108 and disks 110–114. Although three disks 110–114 are shown, a larger or smaller number of disks 110–114 can be used without departing from the scope of the present invention. The disks 110–114 are typically smaller in bandgap than the outer semiconductor layers 106–108, e.g., if the disks 110–114 are GaAs, then the outer semiconductor layers are of a larger band gap material than GaAs, e.g., AlGaAs. The central disk 112 is typically larger or taller than the outer disks 110 and 114. The barrier 116 between disks 110 and 112 and the barrier 118 between disks 112 and 114 are sufficiently thin to allow an electron to rapidly tunnel through the barriers 116 and 118. A structure consisting of a set of three disks 110–114 and the two intervening barriers 116–118 is hereafter called a quantum dot (QD), referred to herein as control bit 102 and target bit 104. Each QD 102 and 104 that participates in the quantum computation must have one and only one electron within the QD 102 or 104.

Below and above each QD 102 and 104 is an electrical gate 120 and 122, shown in QDs 102 and 104. These gates are used to apply electrical voltages substantially simultaneously to QD 102 and 104 across the length 124 of a QD 102 or 104. The QDs 102 and 104 are located in a three-dimensional cavity 126. The cavity 126 can contain many QDs 102 and 104.

Figure 2:
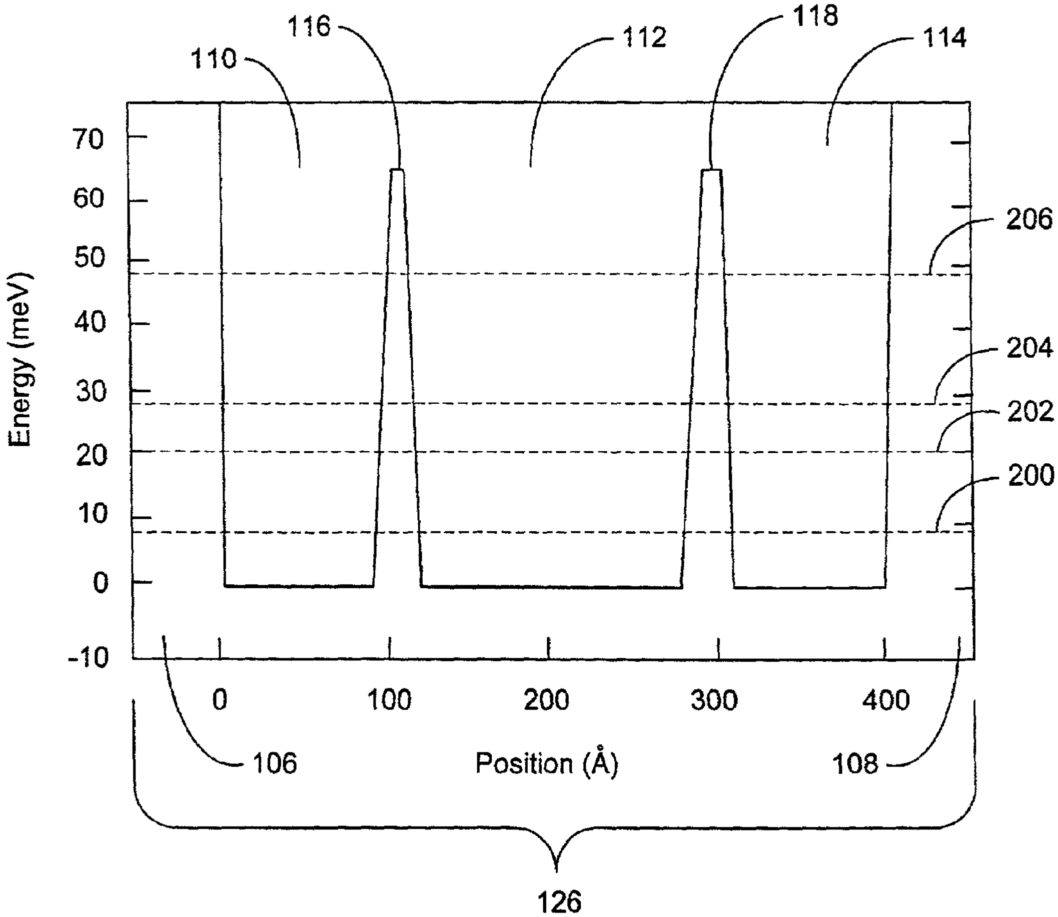
FIG. 2 illustrates the potential and four lowest electronic energy levels for a particular realization of a quantum dot within the computer of the present invention.

FIG. 2 illustrates the potential and four lowest electronic energy levels for a particular realization of a QD within the computer of the present invention. The lowest two energy levels 200 and 202, also referred to as energy levels |1> and |1>, form the qubits which store quantum information. The third energy level 204, also referred to as energy level |2>, serves as an auxiliary state to perform conditional rotations of the state vector of the qubit. Voltages applied to the gates 120 and 122 are used to control the spacing between and absolute values of the energy levels of the QDs 102 and 104 via the Stark effect. As shown in FIG. 2, the energy levels 200, 202, 204 and 206 are all below the barrier heights of barriers 116 and 118, and are allowed energy states in each of the disks 110–114. A large number of individually-gated QDs 102 and 104 are contained in a 3-D microcavity 126 whose fundamental resonance has a wavelength $\lambda_C$ much longer than the length of a QD 124. A continuous-wave laser with a fixed wavelength different than $\lambda_C$ is introduced through one side of the cavity 126.

Figure 3A:
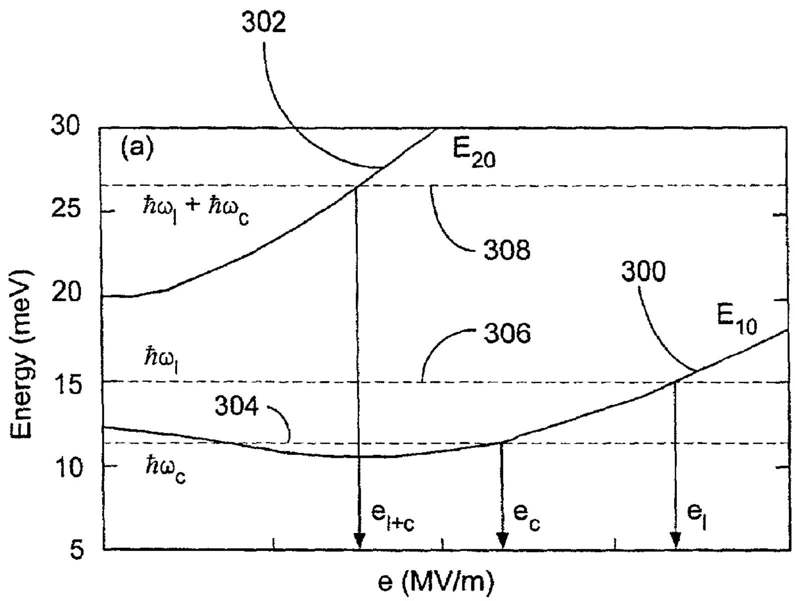
FIG. 3A illustrates the energy levels of the transitions in a quantum dot computer of the present invention.
Figure 3B:
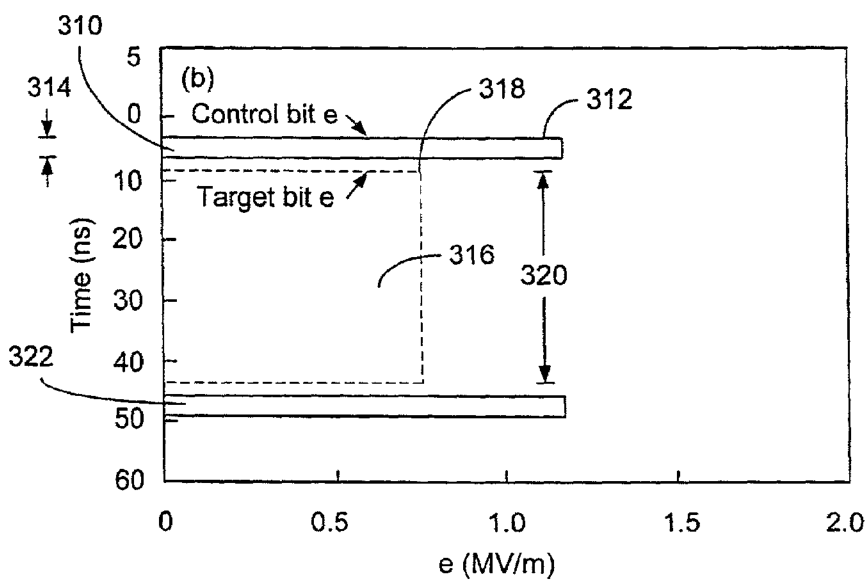
FIG. 3B illustrates a sequence of voltage pulses that effect a two-qubit gate that is equivalent to a CNOT operation in a quantum dot computer of the present invention.

FIG. 3A illustrates the energy levels of the transitions in a quantum dot computer of the present invention, and FIG. 3B illustrates a sequence of voltage pulses that effect a two-qubit gate that is equivalent to a CNOT operation in a quantum dot computer of the present invention.

With reference to FIG. 3A, energies $E_{10}$ 300 and $E_{20}$ 302 show the state 0 to state 1 and state 0 to state 2 energy levels, respectively. The energies of a cavity 126 mode photon $h\omega_C$, 304, a laser photon $h\omega_L$ 306, and the sum of $h\omega_C+h\omega_L$ 308, are also shown. The state of an electron in a QD 102 or 104 can be coherently manipulated by tuning $E_{10}$ 300 and $E_{20}$ 302 into and out of resonance with $\hbar\omega_C$, 304, $h\omega_L$ 306, and the sum of $h\omega_C+\hbar\omega_L$ 308.

A general Hamiltonian describing a QD 102 or 104 interacting with cavity 126 photons and the laser field is given by $$\hat{H}=\hbar\omega_C\hat{a}_C+E_{10}(e)\sigma_{11}+E_{20}(e)\sigma_{22}$$

$$+\hbar g_{01}(e)\{\hat{a}_C+\sigma_{01}+\sigma_{10}+\hat{a}_C\}+\hbar\Omega_{1,01}(e)\{\sigma_{01}\exp(i\omega_1 t)+\sigma_{10}\exp(i\omega_1 t)\}$$

$$+\hbar_{12}(e)\{\hat{a}_C+\sigma_{12}+\sigma_{12}\hat{a}_C\}+\hbar\Omega_{1,12}(e)\{\hat{a}_C\sigma_{12}\exp(i\omega_1 t)+\sigma_{21}\hat{a}_C\exp(\omega t)\}$$

where $\hat{a}_C$ denotes the cavity 126 mode annihilation operator, and $\sigma_{IJ}$=|i×j| is the projection operator from QD state |j> to state |i>.

The vacuum Rabi frequencies are $g_{IJ} \approx q z_{IJ} e_{VAC}$, where $$e_{VAC} = \sqrt{\frac{\hbar\omega_C}{2\varepsilon_0 \varepsilon V}}$$

is the amplitude of the vacuum electric field in the cavity 126,

ε=the dielectric constant of the cavity 126,

V=the volume of the cavity 126, q=the electronic charge, and $z_{IJ}$ is the dipole matrix of the |i> to |j> transition.

One step in the CNOT operation is a Rabi oscillation between states |0> and |2> involving both cavity 126 and laser photons at $e=e_{L+C}$.

Operation of the Quantum Computer

During the operation of the quantum computer of the present invention, a qubit that stores quantum information is in state |0> or state |1>, and the electric field across the qubit is held at a value where the energy levels of the qubit are not resonant with $\hbar\omega_C$, $\hbar\omega_L$, or $\hbar\omega_C+\hbar\omega_L$. The value of this electric field is typically zero, but can be other values. The typical value of the electric field is called the fiducial value of the electric field. For $e \approx e_C$, and either the cavity 126 contains one photon or the qubit state vector is in state |1>, then the qubit will execute vacuum Rabi oscillations with frequency $g_{014}$, in which the probability of finding one photon in the excited state oscillates ninety degrees out of phase with the probability of finding one photon in the cavity 126. For $e \approx e_L$, the state vector of the qubit rotates between states |0> and |1> with laser Rabi frequency $\Omega_{1,01}$. For $e \approx e_{L+C}$, and the cavity 126 contains one photon and the qubit state vector begins in state |0>, then the qubit rotates between states |0> and the auxiliary state |2> with frequency $\Omega(e_{L+C})$. If either the qubit is in state |1> or the cavity 126 does not contain a photon, then the qubit state vector is not rotated for $e \approx e_{L+C}$.

The Controlled NOT Operation

A Controlled NOT (CNOT) operation is effected by a series of voltage pulses applied across the gates of a pair of qubits. The pulses begin and end with the qubit at the fiducial electric field (e=0), and rise to a target value of $e_C$, $e_L$, or $e_{L+C}$.

With reference to FIG. 3B, the cavity 126 always begins without any photons. First, a "π" pulse 310 with height $e_C$ 312 and duration $\pi/2g_{01}$, 314 is applied to the control bit 102, e.g., across contacts 120 and 122 of QD 102. If the control bit 102 is in state |0>, the control bit 102 is unaffected. If the control bit 102 is in state |1>, the control bit 102 rotates into state |0> and acquires a phase i, and the cavity 126 acquires a single photon.

A 2π pulse 316 with height $e_{L+C}$ 318 and duration $\pi/\Omega(e_{L+C})$ 320 is then applied to the target bit 104. If the target bit 104 is in state |1>, the target bit 104 is unaffected. If the target bit 104 is in state |0>, and the cavity 126 contains one photon, the target bit 104 acquires a phase of −1.

A pulse 322 with height $e_C$, substantially identical to the π pulse 310, is again applied to the control bit 102. If there is a photon in the cavity 126 it is absorbed by the control bit 102, returning the control bit 102 to state |1> while the control bit 102 acquires another phase i. The end result is a gate in which the state vector of the two-qubit system, e.g., the two qubits being the control bit 102 and the target bit 104, acquires a phase −1 if and only if both control and target bits 102 and 104 are initially 1.

The sequence of state-vector rotations which is effected by the series of electric field pulses is identical to the sequence effected by a series of laser pulses applied to cold trapped ions. In order to effect a CNOT operation, i.e., inversion of the target bit 104 if and only if the control bit 102 is 1, it is necessary to apply to the target bit 104 "π/2" and "3π/2" pulses with height $e_L$ and durations $\pi/(4\Omega e_{L+C})$ and $3\pi/(4\Omega_{L,01})$, respectively, before and after the sequence shown in FIG. 3B.

In essence, the electric field pulses applying a first voltage across a control bit structure and a second voltage across a target bit structure. The quantum levels of excitation within the control bit structure and the target bit structure are obtained based on the applied first and second voltages, an initial excitation level of the control bit structure, and an initial excitation level of the target bit structure. As described above, the target bit structures and the control bit structure are interchangeable within the present invention, e.g., for a first computation, a first structure can be the control bit structure and a second structure can be the target bit structure. For a second computation, the first structure can be the target bit structure and the second structure can be the control bit structure.

To ensure the fidelity of CNOT operations, the rise and fall times of the pulses 310, 316, and 322 must be short compared to the period of the Rabi oscillation at the target bit 104 electron. At the same time, in order to minimize the probability of a transition between the |0> and |1> states induced by the ramping electric field, the changes to the Hamiltonian must be adiabatic, e.g., $\delta t >> \hbar/E_{10}$. Further, the timing between the successive pulses 310, 316, and 322 in the CNOT operation must be adjusted to compensate for the quantum-mechanical phases accumulated by inactive qubits in their excited states. It also may be required to adjust the heights and durations of the pulses 310, 316, and 322 to account for alternating current Stark shifts in the energy levels of the QDs 102–104 which are induced by the laser field.

Other Actions Performed on the Quantum Computer

Other actions that are performed or required by a quantum computer include initialization of the computer, inputting data, reading out the data stored in the computer, correcting errors in the computer, and decoherence of the electronic state of the QD 102 and 104.

Initialization of the quantum computer requires that each qubit 102–104 be in a well-defined state prior to any quantum computation. The present invention performs initialization by applying the proper fiducial voltage to the gates 120–122 of the qubits 102–104, and a proper temperature to each qubit 102–104 for the requisite amount of time, until each qubit 102–104 relaxes to a ground state. Typically, a voltage of 0 volts, a temperature of T<120 Kelvin, and a wait of less than one second ensures that all qubits 102–104 are in state |0>.

To input initial data, arbitrary rotations of the state vectors of the qubits 102–104 are required to load data into the qubit 102–104 registers. Arbitrary one-bit rotations of the qubits 102–104 are effected in the present invention by using Rabi oscillations induced by the laser field, by applying pulses with height $e_L$ and duration between 0 and $2\pi/(\Omega_{L,01})$. To read the data back from the qubit 102–104 registers after a quantum computation is completed, the state of each qubit 102–104 is measured. A narrow-band detector with high quantum efficiency is used to detect single terahertz (THz) photons at the frequency of the cavity 126 mode $\omega_C$. The qubits 102–104 can then be read out sequentially by tuning each qubit 102–104 to $\omega_C$. If the qubit 102–104 is in state |1>, it will emit a photon which will be detected by the narrow-band detector. If the qubit 102–104 is in state |0>, no photon will be emitted. The emissions and non-emissions from each qubit 102–104 can then be read by the detector and reported.

For error correction, the qubits 102–104 must be executed in parallel. To perform parallel execution, the cavity 126 is enlarged to create several cavity 126 modes in the frequency range over which the QD 102–104 energy level spacings are tunable. A separate but equivalent approach is to couple nearest-neighbor QDs 102–104, and perform an enlarged cavity 126 schema as in the present invention.

Decoherence

Decoherence of the electronic state of the QD 102–104 as well as decoherence of the cavity 126 photons are problematic areas for quantum computers 100. Deductions on the energy relaxation times result in times of $q/I=10^{-7}$ seconds for transitions with energies near 50 microelectron volts ($\mu$eV). However, the geometry of the present invention is quite different, and, as such, results in different relaxation times. The lifetime of a cavity 126 photon must be sufficiently long to enable many NOT operations with high fidelity. As such, the cavities must be low-loss, few-mode THz cavities.

Decoherence and CNOT Performance Times

Consider now a specific GaAs/AlGa is QD and lossless dielectric cavity 126 designed to minimize the time required for a CNOT operation, while at the same time avoiding the emission of longitudinal optical (LO) phonons ($\hbar\omega_{LO}\approx 36$ meV in GaAs) and also minimizing the rate of acoustic phonon emission. Cavity 126 and laser photon energies are chosen to be 11.5 and 15 meV. These energies are sufficiently large to enable an adequate vacuum electric field $e_{VAC}$ while their sum is still comfortably smaller than $\hbar\omega_{LO}$. Assuming perfect cylindrical symmetry of the disks 110–114, the states 200–206 are labeled with quantum numbers |1,m,n>, associated with the radial, azimuthal and axial degrees of freedom, respectively.

The potential along the cylindrical axis of the QD (z-direction) 102 and the numerically-computed four lowest energy levels 200–206 are depicted in FIG. 2. FIG. 3A shows the transitions $E_{10}$ and $E_{20}$ vs. electric field e. Assuming infinite walls in the radial direction, the radial wavefunctions are given by Bessel functions. The difference between the energy of the ground state 200 and first radial excited state 202 is $\Delta E_R$= 30 meV for radius of the disks 110–114 of a=13 nm, assuming $m^*=m_C/15$. This is higher than the highest energy reached by an electron during a CNOT operation (26.5 mEv=$\hbar\omega_1+\hbar\omega_C$), eliminating dccoherence arising from coupling between axial and radial excited states of the QD 102–104.

The time required to execute a CNOT operation for the QD structure of FIG. 1 is estimated at 150 microseconds. Unconditional 1-bit rotations which occur at $e=e_L$ take only a few picoseconds for a laser electric field of 30 kV/m. Although the laser might need attenuation for such rotations to have a transition time for the electrical pulse shorter than the period of the Rabi oscillation at the target electric field, the decoherence times and transition times allow the computer to perform several thousand CNOT operations before decoherence occurs.

Additional Embodiment of the Quantum Computer

The present invention can also be embodied as a quantum dot doped with a single electron. The spin-states of this conduction-band electron can serve as a qubit with long coherence times.

Figure 4:
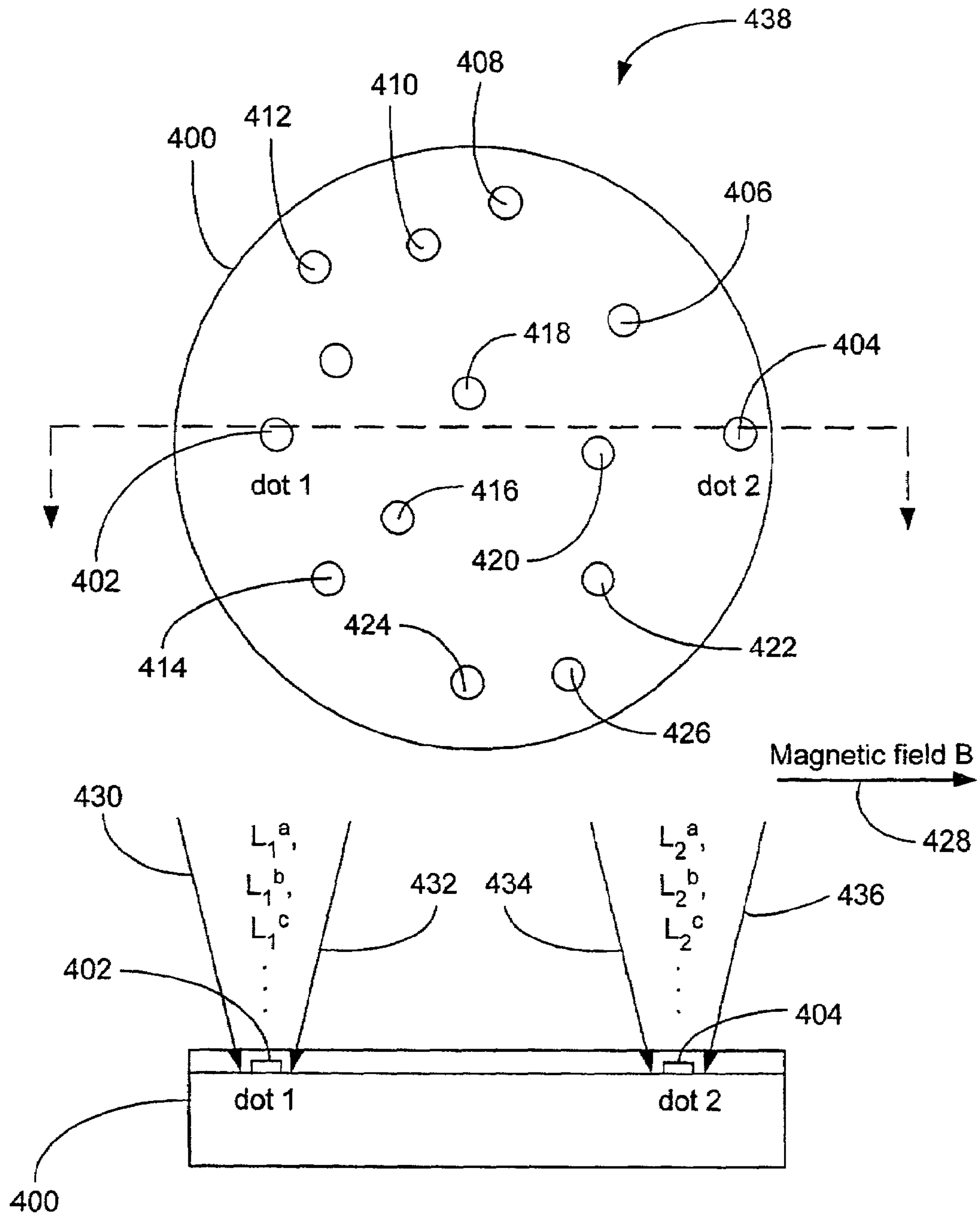
FIG. 4 illustrates a schematic diagram of a quantum computer of the present invention using quantum dot spins coupled to a cavity which is near resonance with an intra-band transition in the quantum dots.

FIG. 4 illustrates a schematic diagram of a quantum computer of the present invention using quantum dot spins coupled to a cavity which is near resonance with an intraband transition in the quantum dots.

Disk 400 is a whispering gallery mode resonator for terahertz radiation, typically fabricated from an undoped semiconductor material, such as silicon or gallium arsenide. Quantum dots 402–426 are embedded in disk 400. Each quantum dot 402–426 contains a single electron. Each quantum dot 400–426 has an intraband transition which is close to the resonant frequency of the same single mode of the whispering gallery mode resonator disk 400. For an alternative implementation, a magnetic field 428 can be used. Laser beams 430–436 are focused on quantum dots 402–426, such that a set of laser beams 430–432 are focused on each quantum dot 402–426. For ease of illustration, only laser beams 430–436 are shown, but each quantum dot 402–426 has a set of laser beams, e.g., $L_n^a$, $L_n^b$, $L_n^c$, . . . for quantum dot "n" 402–426. Each laser beam 430–436 has a frequency and intensity which can be adjusted independently of the other laser beams 430–436. The laser beams 430–436 are used to effect one- and two-bit quantum logic gates from the quantum dots 402–426. Alternatively, the cavity of disk 400 can be embodied as a defect in a photonic bandgap structure instead of a whispering gallery mode resonator, or in a superconductor. The cavity structure shown in FIG. 4 illustrates a spin-terahertz cavity quantum electron dot structure 438. Although shown in a substantially horizontal orientation, quantum dots 402–426 can be coupled in any direction, e.g., horizontal, vertical, or any combination of horizontal and vertical orientations. Each quantum dot 402–426 can also have internal structures similar to that described in FIG. 1, thereby making each quantum dot 402–426 a quantum bit in a quantum computer.

This structure 438 allows for a spin-splitting of the ground-state quantum dot 402–426 conduction band electron, using either a non-zero magnetic field 428 across disk 400, or a pseudo-magnetic field generated using an off-resonant circularly polarized laser beam 430–436. When using laser beams 430–436, large effective magnetic fields are used to introduce large effective magnetic fields yielding a spin-splitting that can be as large as 5 meV.

Further, one bit rotations of a single quantum dot 402–426 electron spin can simply be achieved by spin-flip near-resonant Raman transitions via intermediate valence-band states. The large spin-orbit coupling in the valence band enables coherent flipping of the electron spin in short time scales using two laser beams, e.g., 430–432 for quantum dot 402, with orthogonal linear polarizations that can realize $\pi/r$ pulses, where r is any real number. If the spin splitting is generated by the ac-stark effect of laser beams 430–436 rather than a magnetic field 428, then the spin-flipping can be accomplished by irradiating the entire sample with an oscillating magnetic field, and using the ac stark effect to tune the spin-splitting of selected quantum dots into resonance with the oscillating magnetic field for a duration long enough to effect $\pi/r$ pulses.

Structure 438 allows for a cavity mode that has an energy that corresponds to an intra-band energy spacing. The advantage of structure 438 and structure 100 over other embodiments using this terahertz cavity-quantum electron dot regime is that the wavelength of the cavity mode, which in turn determines the length scale of the quantum dot 402–426 array, could exceed 100 microns, which allows for a large number of quantum dots 402–426 to be coupled through the same cavity mode.

Figure 5:
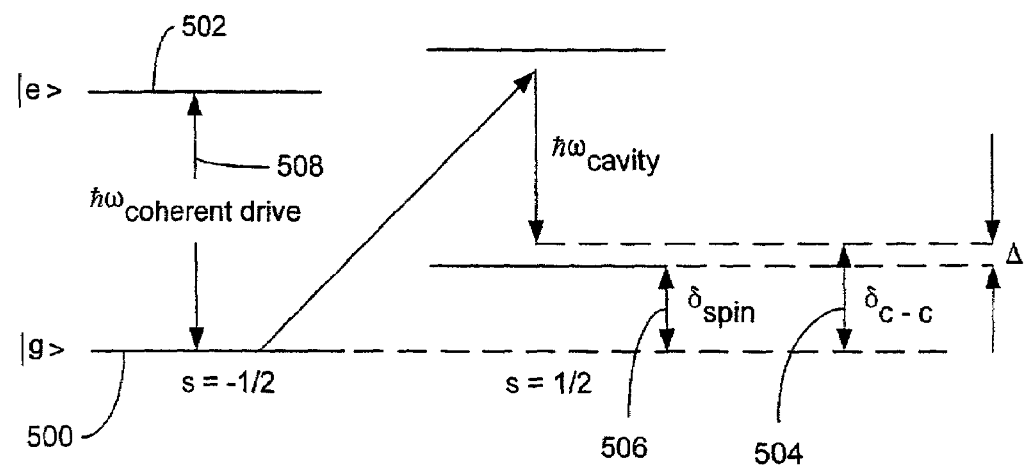
FIG. 5 illustrates the energy level structure, couplings, and detunings within a quantum bit of the computer of FIG. 4.

FIG. 5 illustrates the energy level structure, couplings, and detunings within a quantum bit of the computer of FIG. 4.

To effect non-trivial two-qubit interactions, structure 438 uses selective introduction of a transverse spin-spin coupling between two distant quantum dots. However, structure 438 allows for a coherent drive that couples the ground state 500 and excited state 502 with opposite spin in a single quantum dot 402–426. Further, the cavity mode couples ground state 500 and excited state 502 with the same spin. The coherent drive at a particular quantum dot n 402 and the cavity mode are detuned by an energy 504, shown as $\delta_{c\text{-}c}^{n}$. Together, the coherent drive and the cavity coupling provide a Raman coupling between spin up and spin down in the quantum dot 502, separated by an energy 506 $\delta_{spin}^{n}$. The detuning of the Raman transition in a particular dot from the spin-flip transition is $\Delta^n=\delta_{c\text{-}c}^{n}-\delta_{spin}^{n}$. Distant quantum dots with the same detuning $\Delta$ experience an effective 2 qubit interaction which leads to controlled entanglement in general and CNOT operations in particular. CNOT operations between pairs of quantum dots 402 and 404 with different shared detunings can thus proceed in parallel with the present invention. For example, if quantum dots 402 and 404 share detuning $\Delta_a$, and quantum dots 406 and 408 share a detuning $\Delta_b$ not equal to $\Delta_a$, the CNOT operations involving quantum dots 402 and 404 can proceed in parallel with the CNOT operations involving dots 406 and 408.

The coherent drive can be implemented in a variety of ways. For example, two of the laser beans 430 and 432, with frequencies differing by $\omega_{coherent\ drive}$, shown as difference 508 in FIG. 5, can be applied to each individual quantum dot 402–426. In this case, the coherent coupling is enhanced if the shape of the quantum dot 402–406 is asymmetric. An alternative embodiment of implementing coherent coupling is via a coherent terahertz field and a magnetic field 428 that is perpendicular to the effective magnetic field induced by a circularly polarized laser beam 430.

The method described with respect to the present invention is useful in implementing a two-qubit operation, like a CNOT operation, between distant spins embedded in a cavity which is resonant with an intraband transition.

One method is to set the real magnetic field 428 B=0. Two laser beams 430 and 432 are used, e.g., $L_m^a$ and $L_m^b$ and are incident on quantum dot 402, while a second pair of laser beams 434 and 436 are incident on quantum dot 404. One of these laser fields, e.g., $L_m^a$, is circularly polarized, and determines the spin splitting of the ground state of quantum dot 402, via the ac Stark effect. The second laser field focused on quantum dot 402, $L_m^b$, is detuned from the frequency of $L_m^a$ by $\omega_{coherent\ drive}$, providing an effective coherent drive. When the two-photon detunings $\Delta$ are chosen, they are determined by the energy difference between spin splitting and the energy difference of the cavity mode and the coherent drive and are identical for the control and target qubits. Transverse spin-spin coupling can thus be established. Such coupling can implement a CNOT gate. One advantage of this particular implementation is that the energies of the spin states in a quantum dot 402–426 are different only while the lasers 430–436 are turned on. While the lasers 432–436 are off, no quantum-mechanical phase difference between ground state 500 and excited state 502 will accumulate.

Another method to implement the two-qubit operation is to set an external magnetic field 428 $B=B_x$ where field 428 is substantially perpendicular to the effective magnetic field induced by the circularly polarized laser beam 430. For example, in disk-shaped quantum dots 402–426 with strong confinement in the z-direction, a circularly polarized laser field 430 is applied that generates an effective magnetic field in the z-direction. A coherent terahertz field is applied that is polarized parallel to the cavity mode. In such a configuration, parallel linearly polarized coherent terahertz and cavity modes with energy difference near the ground-state spin-splitting can be used to achieve the necessary coupling between the two spin states.

Figure 6:
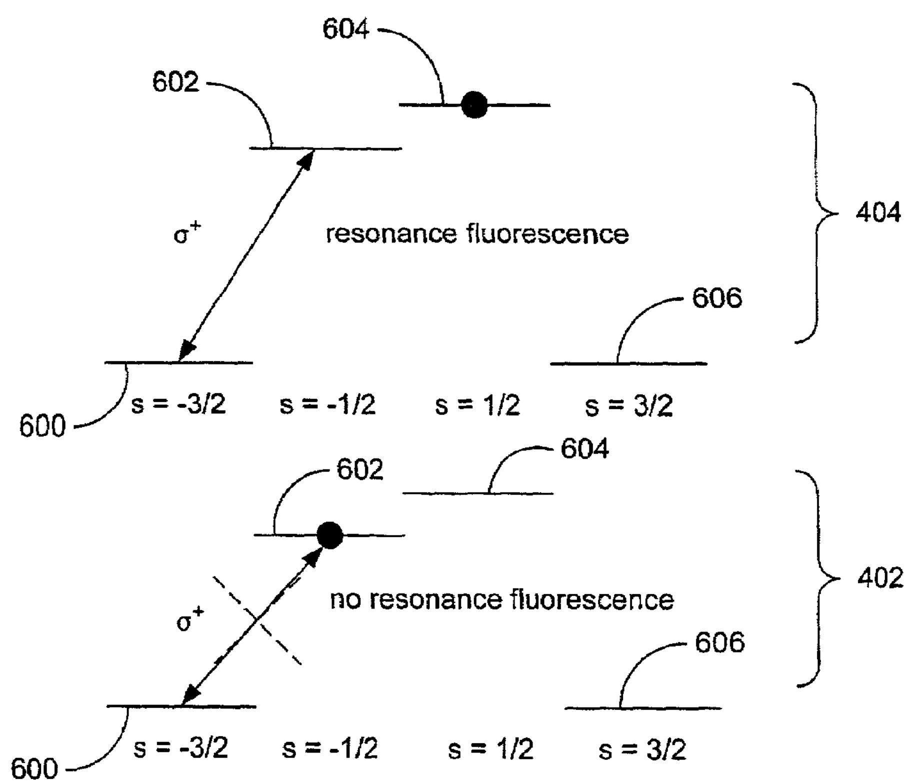
FIG. 6 illustrates an illustration of a readout of a quantum bit in the spin-state computer of the present invention.

FIG. 6 illustrates an illustration of a readout of a quantum bit in the spin-state computer of the present invention. The states of the quantum bits 402 and 404 can be read by using resonant fluorescence of the quantum bits 402 and 404. A magnetic field 428 is applied to disk 400, which splits the spin states of the electron and the hole in each quantum dot 402–426. A circularly polarized laser beam 430 is tuned to a transition between the valence band and one of the spin states 600–606 in the quantum dot 402–426. If the spin state is empty, e.g., states 600 and 602 in quantum dot 404, the laser 430 field alternatively populates and stimulates emission from the empty state 602, which results in a resonance fluorescence signal. The resonance fluorescence signal lasts for as long as the state 602 remain empty. If the state 602 is occupied by an electron, e.g., as shown in quantum dot 402, the absorption of the laser 420 field is Pauli blocked, and no light is emitted from the quantum dot 402. The emission/lack of emission provides a readout of the state of quantum dots 402–426.

Process Chart

Figure 7:
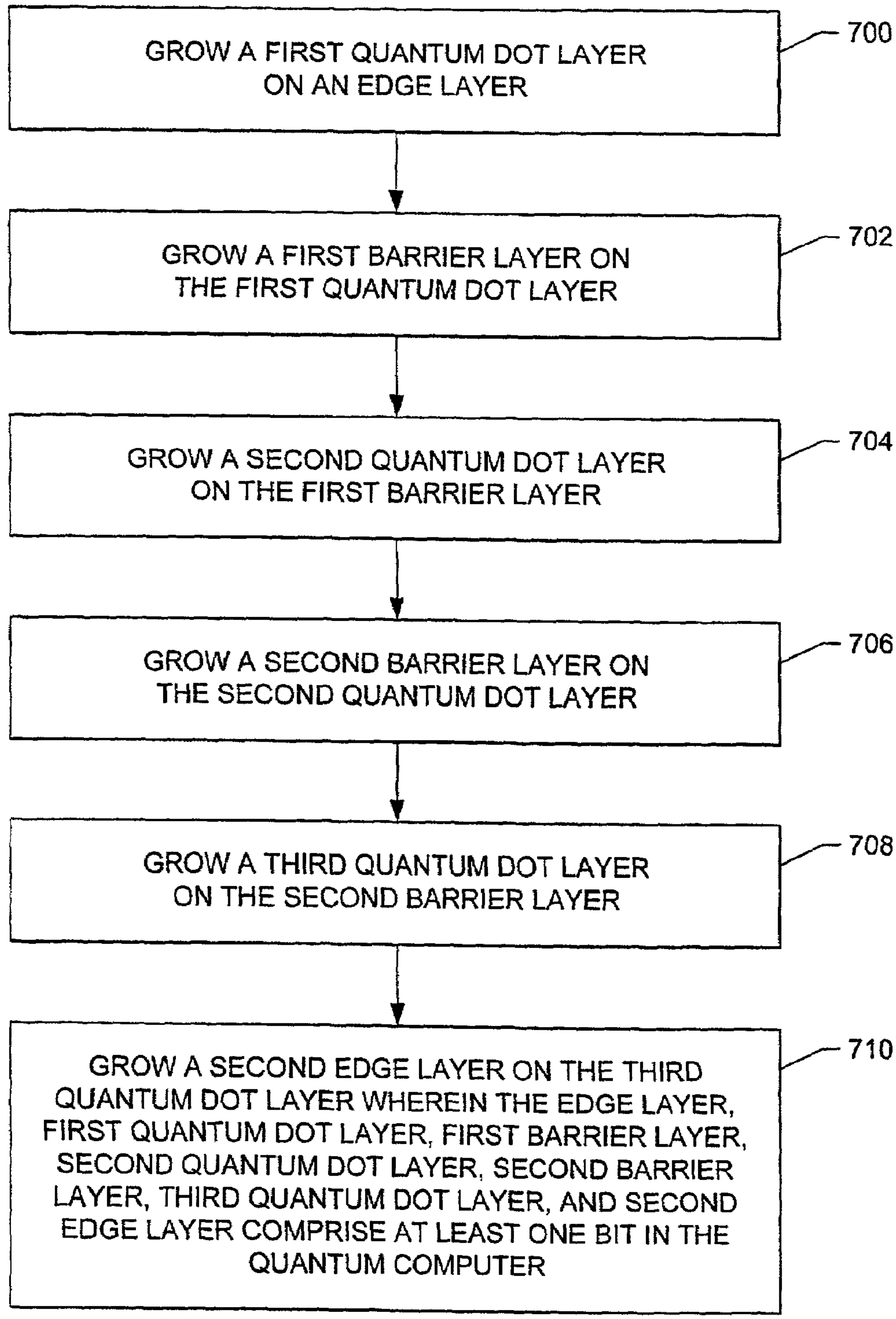
FIG. 7 is a flow chart illustrating the steps used to practice the present invention.

FIG. 7 is a flow chart illustrating the steps used to make the quantum dots of the present invention.

Block 700 illustrates performing the step of growing a first quantum dot layer on an edge layer.

Block 702 illustrates performing the step of growing a first barrier layer on the first quantum dot layer.

Block 704 illustrates performing the step of growing a second quantum dot layer on the first barrier layer.

Block 706 illustrates performing the step of growing a second barrier layer on the second quantum dot layer.

Block 708 illustrates performing the step of growing a third quantum dot layer on the second barrier layer.

Block 710 illustrates performing the step of growing a second edge layer on the third quantum dot layer wherein the edge layer, first quantum dot layer, first barrier layer, second quantum dot layer, second barrier layer, third quantum dot layer, and second edge layer comprise at least one bit in the quantum computer.

To grow the quantum dots of the present invention as shown in FIG. 1, stacked self-assembled quantum dots can be used. Another method is to make QDs made by growing GaAs/AlGaAs quantum wells with the conduction band profile tailored to give the desired potential in the z-direction, depositing small islands on top of the quantum well to serve as an etch mask, etching through the quantum well layers which are not protected by the islands, and then regrowing AlGaAs. The growth methods used to grow the QDs 102 and 104 comprise those used in the art, such as Metal Organic Chemical Vapor Deposition (MOCVD), Metal Organic Molecular Beam Epitaxy (MOMBE), wet or dry etching of the materials, or other growth methods.

CONCLUSION

In summary, the present invention discloses an apparatus and method for quantum computing. The apparatus comprises a control bit structure, a target bit structure, and gate electrodes, coupled to the control bit structure and the target bit structure, for applying a voltage across the control bit structure and the target bit structure, wherein the control bit structure and the target bit structure obtain quantum levels of excitation from the applied voltages based on an initial excitation level of the control bit structure and an initial excitation level of the target bit structure.

The method of the present invention comprises applying a first voltage across a control bit structure, applying a second voltage across a target bit structure, and obtaining quantum levels of excitation within the control bit structure and the target bit structure based on the applied first and second voltages, an initial excitation level of the control bit structure and an initial excitation level of the target bit structure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for effecting gate operations using one or more semiconductor quantum bits, wherein the semiconductor quantum bits are contained in a cavity, an electromagnetic field is applied to excite the semiconductor quantum bits to one or more energy levels, and the semiconductor quantum bits so excited contain information used to implement the gate operations, the method comprising:

coherently coupling the semiconductor quantum bits using a mode in the cavity that has a resonant frequency substantially coincident with a transition between the energy levels of the semiconductor quantum bits.

2. The method of claim 1, wherein the semiconductor quantum bits are arranged in an array.

3. The method of claim 1, wherein each of the semiconductor quantum bits is a quantum dot doped with a single electron.

4. The method of claim 3, wherein the information is represented by the states of an electron trapped in the quantum dot.

5. The method of claim 4, wherein the information is contained in a spin-state of the electron.

6. The method of claim 5, further comprising the step of reading the information by determining the spin-state of the trapped electron.

7. The method of claim 6, wherein the spin-state is determined by detecting selective fluorescent emissions from the trapped electron.

8. The method of claim 1, wherein the cavity is a whispering-gallery-mode resonator.

9. The method of claim 1, wherein the cavity is a defect in a photonic band-gap structure.

10. The method of claim 1, wherein the cavity is a superconductor structure.

11. The method of claim 1, wherein the electromagnetic field includes a component generated by one or more laser beams.

12. The method of claim 1, wherein the electromagnetic field includes a component generated by an externally applied magnetic field.

13. The method of claim 1, wherein the gate operations result in a conditional NOT operation.

14. The method of claim 1, wherein the semiconductor quantum bits are vertically coupled quantum dots.

15. The method of claim 1, wherein the semiconductor quantum bits are horizontally coupled quantum dots.

16. A quantum computing apparatus, comprising:

a cavity containing one or more semiconductor quantum bits; and means for applying an electromagnetic field to the cavity to excite the semiconductor quantum bits to one or more energy levels, wherein the semiconductor quantum bits are coherently coupled using a mode in the cavity that has a resonant frequency substantially coincident with a transition between the energy levels of the semiconductor quantum bits.

17. The apparatus of claim 16, wherein the semiconductor quantum bits are arranged in an array.

18. The apparatus of claim 16, wherein each of the semiconductor quantum bits is a quantum dot doped with a single electron.

19. The apparatus of claim 18, wherein the information is represented by the states of an electron trapped in the quantum dot.

20. The apparatus of claim 19, wherein the information is contained in a spin-state of the electron.

21. The apparatus of claim 20, further comprising means for reading the information by determining the spin-state of the trapped electron.

22. The apparatus of claim 21, wherein the spin-state is determined by detecting selective fluorescent emissions from the trapped electron.

23. The apparatus of claim 16, wherein the cavity is a whispering-gallery-mode resonator.

24. The apparatus of claim 16, wherein the cavity is a defect in a photonic band-gap structure.

25. The apparatus of claim 16, wherein the cavity is a superconductor structure.

26. The apparatus of claim 16, wherein the electromagnetic field includes a component generated by one or more laser beams.

27. The apparatus of claim 16, wherein the electromagnetic field includes a component generated by an externally applied magnetic field.

28. The apparatus of claim 16, wherein the quantum computing apparatus performs gate operations that result in a conditional NOT operation.

29. The apparatus of claim 16, wherein the semiconductor quantum bits are vertically coupled quantum dots.

30. The apparatus of claim 16, wherein the semiconductor quantum bits are horizontally coupled quantum dots.

31. A method of storing information in quantum states of electrons in semiconductor quantum bits comprising electron-doped quantum dots, wherein multiple quantum dots are located in a cavity excited by an electromagnetic field, the method comprising:

effecting a controlled NOT (CNOT) operation involving any pair of quantum dots by tuning energy levels of the quantum dots into resonance with frequencies of the cavity.

32. The method of claim 31, wherein the energy levels of the quantum dots are tuned by voltages applied to gates across the quantum dots.

33. The method of claim 31, wherein the energy levels of the quantum dots are tuned by pulses of electromagnetic radiation focused onto the quantum dots.

34. The method of claim 31, wherein the semiconductor quantum bits are arranged in an array.

35. The method of claim 31, wherein each of the semiconductor quantum bits is a quantum dot doped with a single electron.

36. The method of claim 35, wherein the information is represented by the states of an electron trapped in the quantum dot.

37. The method of claim 36, wherein the state of the electron is determined by detecting selective fluorescent emissions from the trapped electron.

38. The method of claim 36, wherein the information is contained in a spin-state of the electron.

39. The method of claim 38, further comprising the step of reading the information by determining the spin-state of the trapped electron.

40. The method of claim 39, wherein the spin-state is determined by detecting selective fluorescent emissions from the trapped electron.

41. The method of claim 31, wherein the cavity is a whispering-gallery-mode resonator.

42. The method of claim 31, wherein the cavity is a defect in a photonic band-gap structure.

43. The method of claim 31, wherein the cavity is a superconductor structure.

44. The method of claim 31, wherein the electromagnetic field includes a component generated by one or more laser beams.

45. The method of claim 31, wherein the electromagnetic field includes a component generated by an externally applied magnetic field.

46. The method of claim 31, wherein the semiconductor quantum bits are vertically coupled quantum dots.

47. The method of claim 31, wherein the semiconductor quantum bits are horizontally coupled quantum dots.

48. A quantum computing apparatus, comprising:

a cavity excited by an electromagnetic field, wherein multiple semiconductor quantum bits comprising electron-doped quantum dots are located in the cavity; and means for effecting a controlled NOT (CNOT) operation involving any pair of quantum dots by tuning energy levels of the quantum dots into resonance with frequencies of the cavity.

49. The apparatus of claim 48, wherein the energy levels of the quantum dots are tuned by voltages applied to gates across the quantum dots.

50. The apparatus of claim 48, wherein the energy levels of the quantum dots are tuned by pulses of electromagnetic radiation focused onto the quantum dots.

51. The apparatus of claim 48, wherein the semiconductor quantum bits are arranged in an array.

52. The apparatus of claim 48, wherein each of the semiconductor quantum bits is a quantum dot doped with a single electron.

53. The apparatus of claim 52, wherein the information is represented by the states of an electron trapped in the quantum dot.

54. The apparatus of claim 53, wherein the state of the electron is determined by detecting selective fluorescent emissions from the trapped electron.

55. The apparatus of claim 53, wherein the information is contained in a spin-state of the electron.

56. The apparatus of claim 55, further comprising means for reading the information by determining the spin-state of the trapped electron.

57. The apparatus of claim 56, wherein the spin-state is determined by detecting selective fluorescent emissions from the trapped electron.

58. The apparatus of claim 48, wherein the cavity is a whispering-gallery-mode resonator.

59. The apparatus of claim 48, wherein the cavity is a defect in a photonic band-gap structure.

60. The apparatus of claim 48, wherein the cavity is a superconductor structure.

61. The apparatus of claim 48, wherein the electromagnetic field includes a component generated by one or more laser beams.

62. The apparatus of claim 48, wherein the electromagnetic field includes a component generated by an externally applied magnetic field.

63. The apparatus of claim 48, wherein the semiconductor quantum bits are vertically coupled quantum dots.

64. The apparatus of claim 48, wherein the semiconductor quantum bits are horizontally coupled quantum dots.

* * * * *